United States Patent [19]

Thorgersen et al.

[11] Patent Number: 5,265,071
[45] Date of Patent: Nov. 23, 1993

[54] ELECTROLUMINESCENT WATCH DIAL SUPPORT AND CONNECTOR ASSEMBLY

[75] Inventors: Harold Thorgersen, Woodbury; Lyman Daigle, Bethlehem; Bruce H. Kamens, Thomaston; Anthony L. Rinaldi, Jr., Watertown, all of Conn.

[73] Assignee: Timex Corporation, Middlebury, Conn.

[21] Appl. No.: 12,494

[22] Filed: Feb. 2, 1993

[51] Int. Cl.⁵ .................. G04B 19/30; G01D 11/28
[52] U.S. Cl. ................... 368/67; 368/226; 368/227; 362/23
[58] Field of Search ............ 368/67, 223, 226, 228, 368/233, 234, 239; 362/23, 26-29, 34, 62, 84

[56] References Cited

U.S. PATENT DOCUMENTS

| | | | |
|---|---|---|---|
| 4,181,925 | 1/1980 | Burrows et al. | 362/29 |
| 4,488,818 | 12/1984 | Saurer et al. | 568/71 |
| 4,500,173 | 2/1985 | Leibowitz | 350/345 |
| 4,532,395 | 8/1985 | Zurowski | 200/314 |
| 4,559,582 | 12/1985 | Scardilli et al. | 362/23 |
| 4,667,273 | 5/1987 | Quedray | 362/34 |
| 4,775,964 | 10/1988 | Alessio et al. | 368/67 |

Primary Examiner—Vit W. Miska
Attorney, Agent, or Firm—William C. Crutcher

[57] ABSTRACT

An electroluminescent dial for an analog timepiece comprising a flexible transparent substrate, an inner layer comprising electrically conductive material adhered to the substrate, an EL layer comprising a mixture of electroluminescent material in a binder adhered to the inner layer, and an outer layer covering the electroluminescent layer comprising electrically conductive material, the substrate and the layers comprising a single flexible laminated assembly and having a hole therethrough for accommodating the rotatable stem, and includes a tab portion comprising the substrate and the inner layer extending beyond the EL and outer layers. A dial support member comprising a rigid plate substantially the size and shape of the electroluminescent dial supports the dial on one side of the frame. A printed circuit board disposed on the opposite side of the frame includes an electrical circuit adapted to cause illumination of the EL layer disposed on the printed circuit board and has first and second terminals connected as outputs of the circuit. In a preferred form of the invention the tab portion is bent around the frame after first coating it with protective and electrically conductive ink, and connected to the first terminal. An elastomeric connector is used for the second connection. A modified form of the invention utilizes a shorter tab and elastomeric connectors for both first and second connectors.

10 Claims, 3 Drawing Sheets

ELECTROLUMINESCENT WATCH DIAL SUPPORT AND CONNECTOR ASSEMBLY

BACKGROUND OF THE INVENTION

This invention relates generally to improvements in "analog" wristwatches which are illuminated for telling time in the dark. More particularly, the invention relates to an improved electroluminescent watch dial support and connector assembly, and is an improvement on U.S. Pat. No. 4,775,964 entitled "Electroluminescent Dial for An Analog Watch and Process for Making It" issued Oct. 4, 1988 and assigned to applicants' assignee said patent being incorporated herein by reference.

Assignees' U.S. Pat. No. 4,775,964 disclosed an electroluminescent dial for an analog watch. Under normal daytime viewing conditions, time-indicating indicia printed on the dial are read in conjunction with one or more time indicating hands. The electroluminescent dial comprised a transparent substrate having time-indicating indicia printed on the upper surface and electroluminescent material on its undersurface with an actuating circuit within the timepiece to cause the dial to be uniformly illuminated. The preferred embodiment shown in the patent comprised a rigid self-supporting substrate with conductive layers on either side of the electroluminescent material. Electrical connections to the circuit were provided by a conductive adhesive for attaching the leads to the conductive layers.

The aforesaid patent also disclosed a flexible electroluminescent dial wherein the substrate comprised commercially available Mylar film coated with electrically conductive indium tin oxide (ITO). While a flexible electroluminescent dial offers many advantages, it has been found that excessive flexing or bending may tend to introduce microscopic cracks in the ITO layer causing electrical discontinuities. Furthermore, because of the close tolerances and small clearances in a wristwatch, excessive movement or shifting of a flexible dial may interfere with proper operation of the timepiece.

Accordingly, one object of the present invention is to provide an improved support and connector assembly for an electroluminescent watch dial.

Another object of the invention is to provide an improved construction for supporting a flexible electroluminescent dial for an analog watch.

Still another object of the invention is to provide an improved connector assembly for making electrical connections between the electroluminescent dial and the electrical circuit actuating the electroluminescent layer.

DRAWING

The invention will be better understood by reference to the following description, taken in connection with the appended drawings, in which:

FIG. 1 is a plan view of an analog watch with an electroluminescent dial,

FIG. 2 is a plan view of the watch frame and movement, removed from the case, with portions of the frame broken away to show the printed circuit board, FIG. 3 is a schematic diagram of the electrical circuit on the printed circuit board, FIG. 4 is a plan view of an electroluminescent dial assembly before it is assembled to the movement and frame of FIG. 2, FIG. 5 is an elevation view of the electroluminescent dial assembly shown in FIG. 3, FIG. 6 is an enlarged cross-section (not to scale) taken along the lines VI—VI of FIG. 4, FIG. 7 is a plan view of the back of the watch frame shown in FIG. 2 with details omitted except for the connector, FIG. 8 is a cross-sectional view taken along lines VIII—VIII of FIG. 7, FIG. 9 is a cross-sectional view taken along lines IX—IX of FIG. 7, FIG. 10 is a top plan view of a modified form of the invention, analogous to FIG. 2, FIG. 11 is a plan view of the modified electroluminescent dial assembly analogous to FIG. 4, and FIG. 12 is an enlarged cross-sectional view (not to scale) taken along lines XI—XI of FIG. 11.

SUMMARY OF THE INVENTION

Briefly stated, the invention is practiced by providing a frame for an analog timepiece, a timepiece movement disposed in the frame having a rotatable stem adapted to receive at least one time indicating hand, an electroluminescent dial for the timepiece comprising a flexible transparent substrate, an inner layer comprising electrically conductive material adhered to the substrate, an EL layer comprising a mixture of electroluminescent material in a binder adhered to the inner layer, and an outer layer covering the electroluminescent layer comprising electrically conductive material, the substrate and the layers comprising a single flexible laminated assembly and having a hole therethrough for accommodating the rotatable stem, the assembly further having a tab portion comprising the substrate and the inner layer extending beyond the EL and outer layers, a dial support member comprising a rigid plate substantially the size and shape of the electroluminescent dial extending beneath and supporting the dial on one side of the frame, a printed circuit board disposed on the opposite side of the frame, an electrical circuit adapted to cause illumination of the EL layer disposed on the printed circuit board and having first and second terminals connected as outputs of the circuit, the first and second contact terminals being spaced from the dial, a first connector electrically connecting the first terminal with the inner layer, and a second connector electrically connecting the second terminal with the outer layer.

A preferred form of the invention utilizes bending of the tab portion around the frame for the first connector, coating it with protective and electrically conductive ink, and utilizes an elastomeric connector for the second connector. A modified form of the invention utilizes a shorter tab and elastomeric connectors for both first and second connectors.

DESCRIPTION OF THE PREFERRED EMBODIMENT

Figures 1, 2:
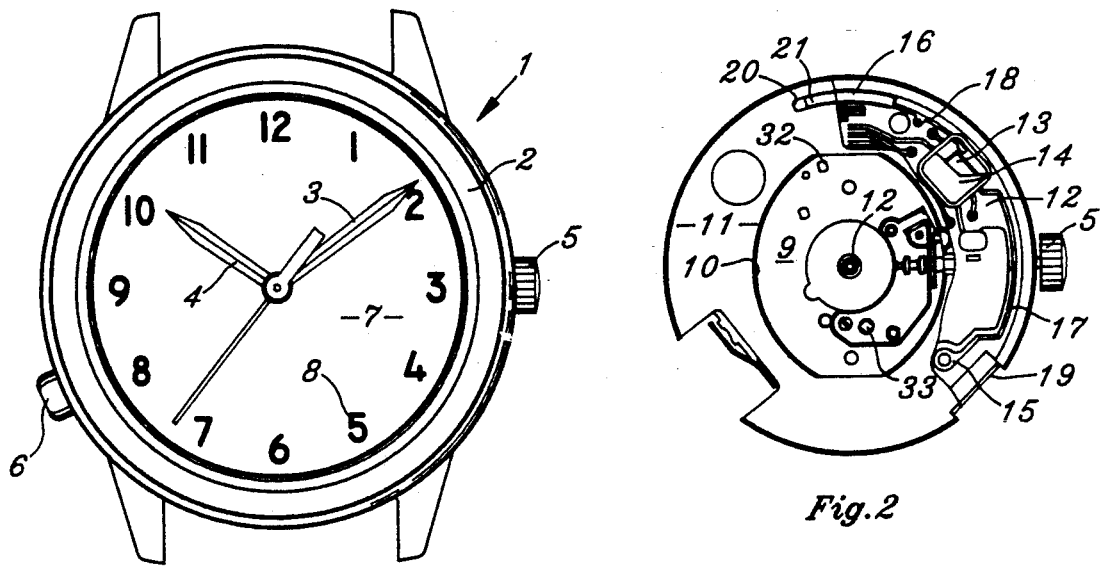

FIG. 1 illustrates a timepiece comprising a wristwatch 1 with a conventional case 2, minute hand 3 and hour hand 4 mounted on rotatable stems and driven by a conventional movement, the details of which are not material to the present invention. A crown 5 is employed to set the position of the time indicating hands 3, 4, while a push button actuator 6 is connected to actuate switch contacts (not shown) inside the case of the watch. Below the hands is a dial 7 having time-indicating indicia thereon, such as hour numerals 8. The dial 7 is an electroluminescent dial having a flexible substrate as described in aforementioned U.S. Pat. No. 4,775,964.

Reference to FIG. 2 of the drawing shows a plan view of the frame and movement removed from case 2, and also omitting hands 3, 4 and electroluminescent dial 7 from the FIGURE in order to see the details of the assembly beneath. A conventional timepiece movement 9 is housed within a correspondingly shaped aperture 10 in a frame 11 of insulating material. Movement 9 includes a conventional quartz analog stepping motor 10 driving a gear train to turn one or more rotatable stems 12 adapted to receive time-indicating hands. Disposed on the underside of frame 11 is a printed circuit board 12 containing electrical circuitry for operating the stepping motor, and also for causing illumination of the electroluminescent dial. A portion of the frame 11 is cut away in the drawing to reveal part of the printed circuit board 12. Disposed on the printed circuit board 12 is a first integrated circuit (not shown) for operating a stepping motor, and a second integrated circuit 13 for operating the electroluminescent dial. Circuit 13 is enclosed by encapsulation 14 and is connected to a first contact terminal 15 and a second contact terminal 16 by means of conductive traces 17, 18 respectively on the printed circuit board. Frame 11 has a cut out portion 19 with a rounded edge in the vicinity of the first terminal 15 and an arcuate slot 20 aligned with the second terminal 16. An elastomeric conductive member 21 (conventional Zebra connector) is disposed in the arcuate slot 20.

Figure 3:
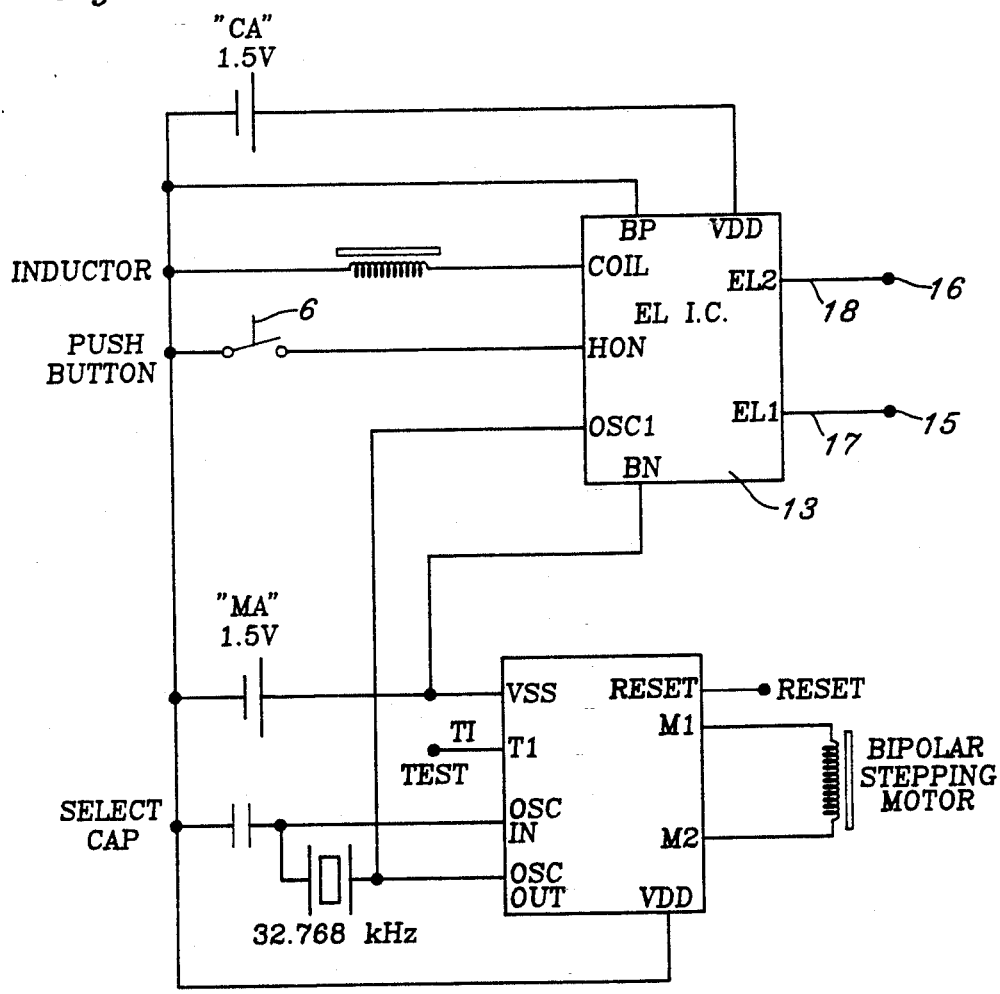

Referring to FIG. 3, a block diagram is shown of the electrical circuitry residing on the printed circuit board 12. The relevant components previously referred to are identified as the push button actuator 6, the integrated circuit 13, first and second terminals 15, 16 and leads 17, 18. An explanation of suitable circuitry may be found in U.S. Pat. No. 4,527,096 issued Jul. 2, 1985 and assigned to applicants' assignee. A suitable movement for movement 12 is described in U.S. Pat. No. 4,744,066 issued May 10, 1988 and assigned to applicants' assignee.

Figure 4:
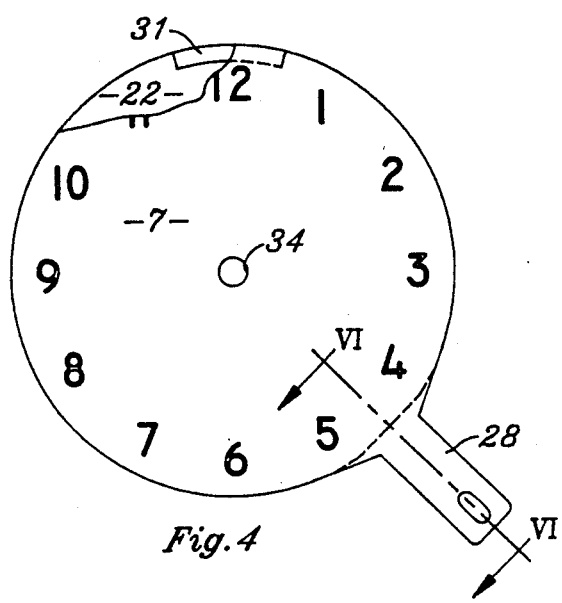
Figure 5:
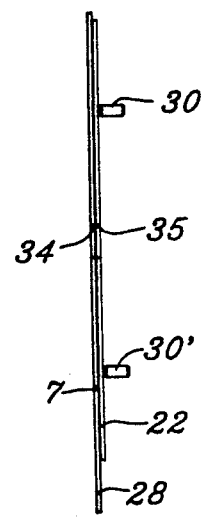
Figure 6:
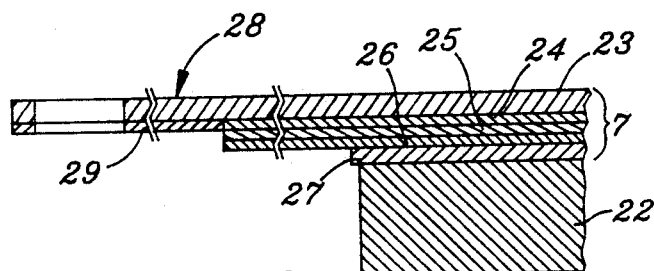

Referring now to FIG. 4 and 5 of the drawing, plan view and elevation view respectively are shown of an electroluminescent dial assembly, comprising the electroluminescent dial 7 disposed on and supported by a dial support member 22. Electroluminescent dial 7 is constructed substantially as described in U.S. Pat. No. 4,775,964. Referring to the enlarged cross-section of FIG. 6, a flexible transparent substrate 23, preferably of Mylar is supplied with a first inner layer 24 of electrically conductive material, preferably indium tin oxide. Layer 24 has adhered thereto a second EL layer 25 of a mixture of electroluminescent material in a polymeric binder. Electroluminescent layer 25 has adhered thereto a third layer 26 of electrically insulating material, preferably barium titanate. Layer 26 has adhered thereto a fourth outer layer 27 of electrically conductive material with reflective qualities. The inner and outer layers of conductive material are capacitively coupled through the electroluminescent layer. The substrate 23 with layers 24–27 together comprise a single flexible laminated assembly which is very thin, i.e. approximately 0.2 mm.

The electroluminescent dial 7 includes a tab portion 28 comprising the substrate and the first layer only, which extends beyond the termination of the second, third and fourth layers. In the preferred embodiment, the first layer of indium tin oxide is coated with a conductive "ink", which is both highly conductive and flexible and with good adhesion to the ITO. The conductive ink is illustrated at reference number 29 in FIG. 6 and is for the purpose of bridging any microcracks in the ITO when tab 28 is bent for contact as will be described. A suitable material for the conductive ink is part number SLP-4070 manufactured by Zymet, Inc. An alternative is manufactured by Ercon, Inc., part number E-1640. The conductive ink may be applied by brush and cured.

Electroluminescent dial 7 is disposed on a rigid flat dial support member 22 having a pair of supporting legs 30 afixed to the underside thereof. Dial support member 22 is substantially the size and shape of the electroluminescent dial, except that it includes a cutout portion 31 aligned with the second terminal so as to permit the elastomeric connector 21 to contact the fourth (or outer) layer of conductive material on the dial.. See FIG. 2. FIG. 2 also illustrates that movement 9 includes a pair of holes 32, 33 arranged to receive the support legs 30 of the dial support member which have enlarged ends which snap into holds 32, 33. In this manner the electroluminescent dial which would otherwise be flexible is supported by the flat surface of dial support member 22. It remains to note that dial 7 and support 22 are provided with aligned center holes 34, 35 which receive the rotatable stem 12. An adhesive is spread on dial support member 22 and EL dial 7 is adhered thereto prior to assembly in the timepiece.

Figure 7:
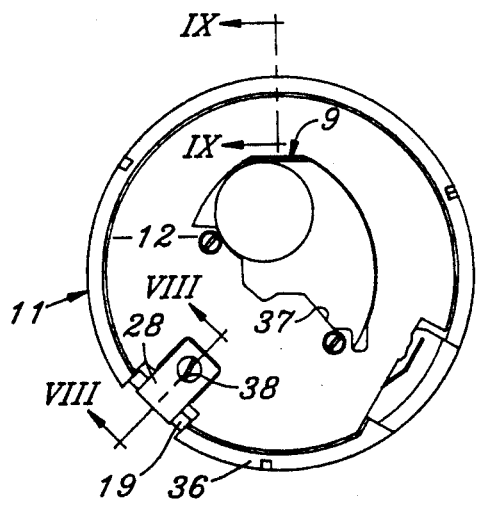

Reference to FIG. 7 of the drawing shows the back side of the timepiece after final assembly. Frame 11 defines a peripheral rim 36 which receives the printed circuit board 12. Printed circuit board 12 has a central opening 37 through which may be seen the watch movement 9. During assembly, the tab 28 on the electroluminescent dial is folded around the outside of the frame 11 in the location of the cutout 19 and secured to the printed circuit board by a screw 38.

Figure 8:
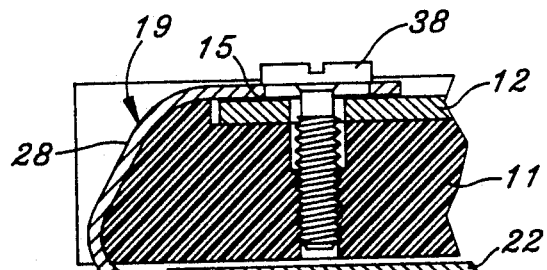

FIG. 8 is a cross section of the folded tab 28 taken along lines VIII—VIII in FIG. 7. Note that FIG. 8 is inverted so that the dial side of the timepiece is on the bottom to correspond to FIG. 7. The FIG. 8 cross section illustrates electroluminescent dial 7 attached to dial support member 22. Tab 28 consisting of the Mylar substrate and the first layer of conductive material is folded around the outside of frame 11 and attached to the first terminal 15 (see FIG. 2) by means of screw 38. Thus the second or inner layer of conductive material is in direct contact with the first terminal 15 and secured by screw 38 to form the first connector.

Figure 9:
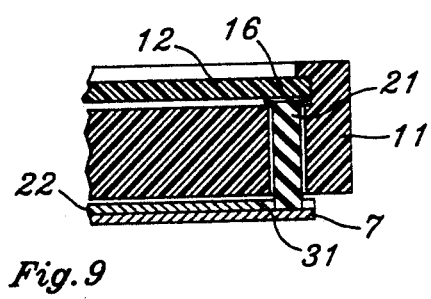

FIG. 9 of the drawing is a cross section through the other electrical connection taken along lines IX—IX of FIG. 7. The printed circuit board 12 is supported in frame 11 and secured thereto by screws (not shown) on one side of the frame, while the electroluminescent dial assembly consisting of dial 7 and dial support member 22 are attached to the opposite side of the frame. The cutout 31 in dial support member 22 (FIG. 4), slot 20 in frame 11 and the second terminal 16 on the printed circuit board (FIG. 2) are all aligned with one another. The elastomeric conductive connector 21 is compressed in slot 20 to provide electrical contact between terminal 16 and the fourth layer of electrically conductive material on the dial 7 to form the second connector.

In this manner, the necessary electrical connections are made between inner and outer layers of the supported electroluminescent dial 7 and the respective first and second terminals connected to the outputs of the electroluminescent driving circuit on the printed circuit board.

MODIFICATION

Figure 10:
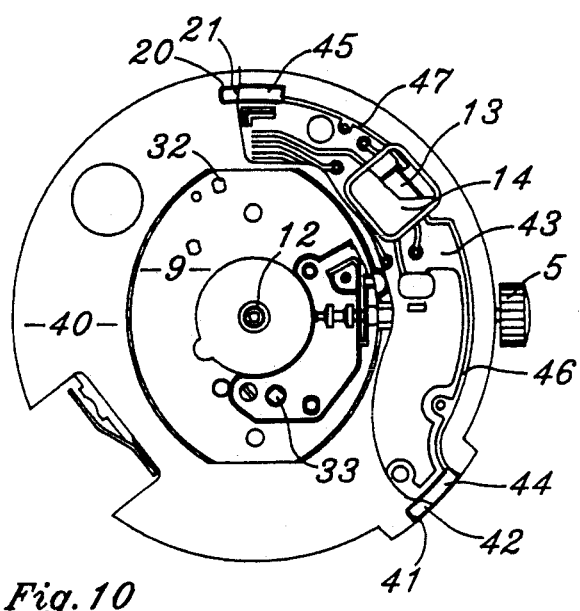
Figure 11:
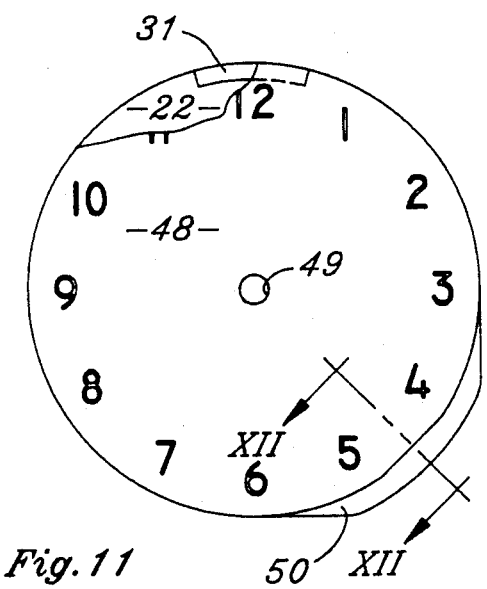
Figure 12:
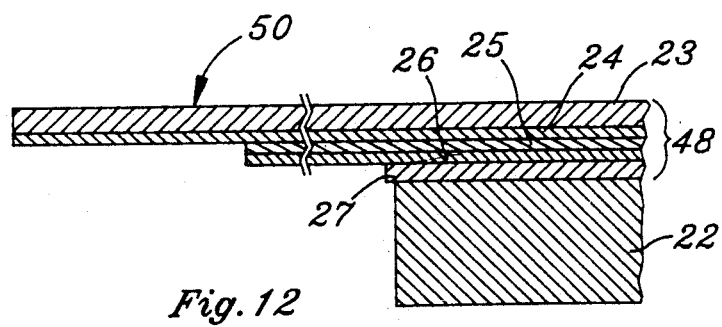

A modified form of the invention is seen in FIGS. 10-12. In the modified form, an additional elastomeric connector is used instead of a folded tab.

FIG. 10 illustrates a movement 9 disposed within a modified frame 40. In addition to the arcuate slot 20 and elastomeric connector 21, there is provided an additional arcuate slot 41 and an additional elastomeric connector 42. A modified printed circuit board 43 includes a first terminal 44 and a second terminal 45 connected to integrated circuit 13 by traces 46, 47 respectively.

Referring to FIG. 11, a modified electroluminescent dial 48 with a central hole 49 is disposed on a dial support member 22 which may be the same as previously described. Dial 48 has an extending tab portion 50, which is not intended to be bent as before, but is designed to receive an elastomeric connector.

FIG. 12 is a cross section taken along lines XII—XII of FIG. 11. FIG. 12 shows the electroluminescent dial 48 to be constructed the same as previously described with substrate 23, and first, second, third and fourth layers 24, 25, 26, and 27 respectively. It should be noted that the tab 50 consists only of substrate 23 and the first conductive layer 24. Therefore an elastomeric connector 42 may be provided through slot 41 in the frame (see FIG. 10) to connect the first terminal 44 directly to the first or inner conductive layer on tab 50. The elastomeric connector 21 connects the second terminal 45 directly to the fourth or outer conductive layer in the same manner as previously described in connection with FIG. 9.

While there has been described what is considered to be the preferred embodiment of the invention and one modification thereof, it is desired to secure in the appended claims all such modifications as fall within the true spirit and scope of the invention.

We claim:

1. A frame for an analog timepiece,
   a timepiece movement disposed in the frame having a rotatable stem adapted to receive at least one time indicating hand,
   an electroluminescent dial for the timepiece comprising a flexible transparent substrate, an inner layer comprising electrically conductive material adhered to the substrate, an EL layer comprising a mixture of electroluminescent material in a binder adhered to the inner layer, and an outer layer comprising electrically conductive material, the substrate and the layers comprising a single flexible laminated assembly and having a hole therethrough for accommodating the rotatable stem, the assembly further having a tab portion comprising the substrate and the inner layer extending beyond the EL and outer layer,
   a dial support member comprising a rigid plate substantially the size and shape of the electroluminescent dial extending beneath and supporting the dial on one side of the frame,
   circuit means adapted to cause illumination of the EL layer having first and second terminals connected as outputs of the circuit means, the first and second contact terminals being spaced from the dial,
   first means electrically connecting the first terminal with the inner layer, and
   second means electrically connecting the second terminal with the outer layer.

2. The combination according to claim 1, wherein said first means comprises a terminating end of said tab portion bent around the outside of said frame so that said inner layer directly contacts said first terminal, and including means securing said tab to said first terminal.

3. The combination according to claim 2, wherein said terminating end portion includes a layer of flexible conductive ink covering said inner layer.

4. The combination according to claim 1, wherein said second means comprises an elastomeric, electrically conductive connector extending across said frame and contacting said second terminal and said inner layer at its opposite ends.

5. The combination according to claim 4, wherein said first means comprises an additional elastomeric, electrically conductive connector extending across said frame and contacting said first terminal and said inner layer at its opposite ends.

6. A frame for an analog timepiece,
   a timepiece movement disposed in said frame having a rotatable stem adapted to receive at least one time indicating hand,
   an electroluminescent dial for said timepiece comprising a flexible transparent substrate, a first layer comprising electrically conductive material adhered to said substrate, a second layer comprising a mixture of electroluminescent material in a binder adhered to said first layer, a third layer comprising a moisture resistant barrier material adhered to said second layer, and a fourth layer comprising electrically conductive material adhered to said third layer, said substrate and said first, second, third and fourth layers comprising a single flexible laminated assembly and having a hole therethrough for accommodating said rotatable stem, said assembly further having a tab portion comprising said substrate and said first layer extending beyond said second, third and fourth layers,
   a dial support member comprising a rigid plate substantially the size and shape of said electroluminescent dial extending beneath and supporting said dial on one side of said frame,
   a printed circuit board disposed on the opposite side of said frame,
   circuit means adapted to cause illumination of said second layer disposed on said printed circuit board and having first and second terminals connected as outputs of said circuit means, said first and second terminals being spaced from said dial,
   first means electrically connecting said first terminal with said first layer, and
   second means electrically connecting said second terminal with said fourth layer.

7. The combination according to claim 6, wherein said first means comprises a terminating end of said tab portion bent around the outside of said frame so that said first layer directly contacts said first terminal, and including means securing said tab to said first terminal.

8. The combination according to claim 7, wherein said terminating end portion includes a layer of flexible conductive ink covering said first layer.

9. The combination according to claim 6, wherein said second means comprises an elastomeric, electrically conductive connector extending through said frame and contacting said second terminal and said fourth layer at its opposite ends.

10. The combination according to claim 9, wherein said first means comprises an additional elastomeric, electrically conductive connector extending through said frame and contacting said first terminal and said first layer at its opposite ends.

* * * * *